United States Patent [19]

Friedman et al.

[11] 4,151,339
[45] * Apr. 24, 1979

[54] PERESTER-ACYL SULFONYL PEROXIDE CO-INITIATOR FOR VINYL POLYMERIZATION

[75] Inventors: Ronald L. Friedman, San Rafael; Roger N. Lewis, Martinez, both of Calif.

[73] Assignee: Argus Chemical Corporation, Brooklyn, N.Y.

[*] Notice: The portion of the term of this patent subsequent to Nov. 8, 1994, has been disclaimed.

[21] Appl. No.: 520,072

[22] Filed: Nov. 1, 1974

Related U.S. Application Data

[63] Continuation-in-part of Ser. No. 508,475, Sep. 23, 1974, abandoned.

[51] Int. Cl.$^2$ .................. C08F 4/38; C08F 114/06; C08F 218/08; C08F 4/36
[52] U.S. Cl. .................. 526/204; 526/209; 526/214; 526/219; 526/220; 526/223; 526/227; 526/330; 526/344
[58] Field of Search ............... 260/87.1; 526/223, 219, 526/209, 204, 214, 220

[56] References Cited

U.S. PATENT DOCUMENTS

| | | | |
|---|---|---|---|
| 3,624,123 | 11/1971 | Lewis et al. | 526/232 |
| 3,726,847 | 4/1973 | Lewis et al. | 526/228 |
| 3,781,255 | 12/1973 | Balwe et al. | 260/87.1 |

OTHER PUBLICATIONS

H. Bennett, F.A.I.C., "Concise Chemical and Technical Dictionary", Third Enlarged Edition, Chem. Pub. Co. 1974, p. 1103.

*Primary Examiner*—Herbert J. Lilling
*Attorney, Agent, or Firm*—Townsend and Townsend

[57] ABSTRACT

A process for polymerizing vinyl chloride and for copolymerizing vinyl chloride and up to 30 percent by weight of comonomers in aqueous suspension under heat and pressure in the presence of a mixture of an acyl sulfonyl peroxide and a perester of the formula

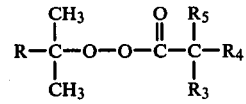

wherein $R_3$, $R_4$, and $R_5$ are the same or different alkyl groups of from 1 to about 10 carbon atoms provided not more than one of $R_3$, $R_4$, and $R_5$ is methyl, and R is selected from 2,2-dimethyl propyl and straight chain alkyl of 1-5 carbon atoms.

13 Claims, No Drawings

PERESTER-ACYL SULFONYL PEROXIDE CO-INITIATOR FOR VINYL POLYMERIZATION

This is a continuation-in-part application of U.S. Ser. No. 508,475, filed on Sept. 23, 1974, now abandoned.

This invention relates to polymerization using organic peroxide initiators. More particularly, it relates to a co-initiator of an acyl sulfonyl peroxide and certain peresters in the polymerization of vinyl chloride and comonomers therewith.

U.S. Pat. No. 3,717,621 teaches the polymerization of vinyl chloride with the combination of acetyl cyclohexyl sulfonyl peroxide (ACSP) and t-butyl perpivalate. The patent teaches that this combination provides several advantages including a particularly short running time in which the polymerization occurs. U.S. Pat. No. 3,781,255 teaches a similar process for the polymerization of vinyl chloride in which ACSP is mixed with other branched peresters. It is stated that the process has a number of advantages over the prior art, including a reduction in the adhesive strength of polymer deposits on the reactor walls, thereby facilitating cleaning and removal of these deposits. U.S. Pat. No. 3,717,621 teaches the use of an aqueous suspension reaction medium having an acidic pH, whereas U.S. Pat. No. 3,781,255 teaches that the reaction medium should include a basic buffer.

The present invention is an improvement on the processes of the above two U.S. patents and provides a polymerization process for vinyl chloride and vinyl chloride with comonomers having all of the desirable features of the processes of said U.S. patents, but in addition providing an improved efficiency in polymer formation. In the present process, conversion of monomer to polymer is substantially accelerated compared with the prior art. Throughout the reaction the percent conversion of monomer to polymer is higher than the prior processes with the reaction being completed overall within a shorter period of time. It is well known in the polymer industry that speed and efficiency of conversion of monomer to polymer is a desirable result. The matter is one of simple economics. If the conversion can be accelerated, more polymer can be made with a given reactor, saving the cost of the installation of additional equipment to achieve an increase in production.

In accordance with the present invention, there is provided a process for polymerizing vinyl chloride, and for copolymerizing vinyl chloride and up to 30 percent by weight of comonomers in aqueous suspension by heating to a temperature of 30°–90° C. under a pressure of up to 15 atmospheres in the presence of peroxide initiator, the improvement wherein said initiator is a mixture of an acyl sulfonyl peroxide and a perester of the formula

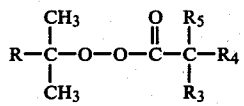

wherein $R_3$, $R_4$, and $R_5$ are the same or different alkyl groups of from 1 to about 10 carbon atoms provided not more than one of $R_3$, $R_4$, and $R_5$ is methyl and R is selected from 2,2-dimethyl propyl and straight chain alkyl of 1–5 carbon atoms, in which the molar proportion between the acyl sulfonyl peroxide and perester is 3:1 to 1:5, and in which the acyl sulfonyl peroxide and perester together are about 0.003–0.2 percent by weight of the monomers.

In the preferred embodiment, a process is used for homopolymerizing vinyl chloride or copolymerizing vinyl chloride with up to about 30 percent by weight of vinyl acetate. Usually, the molar proportion of the acyl sulfonyl peroxide to perester will be 2:1 to 1:4 and the mixture of the acyl sulfonyl peroxide and perester about 0.01–0.1 percent by weight of the monomers.

The principal point of novelty over the prior art is the use of the peresters defined above. The peresters of this invention are disclosed in U.S. Pat. No. 3,624,123, incorporated herein by reference. Additional peresters for use in this invention are more specifically disclosed in copending U.S. patent application Ser. No. 157,683, filed June 28, 1971 for POLYMERIZATION METHOD AND t-ALKYL PERESTERS OF t-HYDROPEROXIDES FOR USE THEREIN, said disclosure also being incorporated herein by reference. U.S. Pat. No. 3,624,123 discloses t-alkyl peroxyesters of neoacids in which the tertiary or alpha carbon atom relative to the carbonyl group of the acid has not more than one, desirably not more than two, and preferably no methyl groups substituted thereon. The patent specifically discloses only t-butyl peroxyesters. Said copending patent application Ser. No. 157,683 discloses higher t-alkyl peroxyesters which can be used in the present process in addition to the t-butyl peroxyesters of said U.S. Pat. No. 3,624,123. In both said U.S. Pat. No. 3,624,123 and copending U.S. patent application Ser. No. 157,683, preferred peresters are t-alkyl perneodecanoates in which the neodecanoate is an isomeric mixture formed by reacting a selected t-alkyl hydroperoxide with the acid chloride of Exxon Chemical Company's neodecanoic acid which is stated by the manufacturer to have an isomer distribution of about 31 percent by weight alpha dimethyl substituted isomers, about 67 percent by weight of alpha-methyl, alpha-higher alkyl isomers and about 2 percent by weight of alpha dialkyl (higher than methyl) substituted isomers. The same neodecanoate peresters are used in the preferred embodiment of the present process and is illustrated in the working examples which will follow.

Aside from the selection of the peresters the present process is generally consonant with the prior art such as disclosed in U.S. Pat. No. 3,717,621 and U.S. Pat. No. 3,781,255. As noted previously herein, the present process is equally beneficial in both an acidic or basic aqueous suspension reaction medium. The other conditions such as amounts, pressure, temperature and the like is similar to that described in these two patents, said disclosure being incorporated herein by reference. However, instead of the single acyl sulfonyl peroxide previously employed in U.S. Pat. Nos. 3,717,621 and 3,781,255, the present process contemplates the use of all of the other acyl sulfonyl peroxides known in the art in addition to ACSP. For example, any of the acyl sulfonyl peroxides disclosed in U.S. Pat. Nos. 3,629,220, 3,586,722, and 3,650,972 may be utilized herein, said patents being incorporated herein by reference. Preferably, the acyl sulfonyl peroxide formula used is as follows:

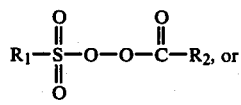

-continued

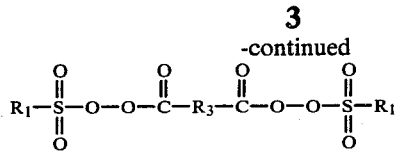

where, (i). $R_1$ and $R_2$ are each selected from the class consisting of alkyl, cycloalkyl, aralkyl and aryl, with each of the aforesaid radicals having not more than 20 carbon atoms; each of the aforesaid radicals may be substituted by lower acyloxy, lower alkoxy, lower alkoxycarbonyl, azido, carboxy, cyano, halo, or sulfo.

(ii). In addition to being any one of the radicals listed above, $R_2$ may be lower alkoxy.

(iii). $R_3$ is alkylene having 1–10, and usually 2–4, carbon atoms.

$R_1$, $R_2$ have not more than 20 carbon atoms in the alkyl, cycloalkyl, aralkyl or aryl radical, and usually not more than 10 carbon atoms. Because these radicals must have at least one carbon atom, the carbon atom content may be expressed as 1–20 and 1–10, respectively. It is to be understood that the foregoing carbon atom content does not include the carbon atoms which may be present in one of the listed substituents.

Alkyl may be primary, secondary, or tertiary. Illustrative alkyl radicals are methyl, ethyl, isopropyl, n-butyl, sec-butyl, isobutyl, t-butyl, sec-phenyl, t-pentyl, sec-hexyl, sec-heptyl, octyl, decyl, dodecyl, hexadecyl, and eicosyl.

Cycloalkyl, aralkyl, and aryl may be a single ring or a fused ring and the ring may be substituted by alkyl, cycloalkyl, or aryl groups; such substituents are counted as a part of the defined carbon atom content of the radical.

Illustrative cycloalkyls are cyclopropyl, methylcyclopropyl, cyclopentyl, methylcyclopentyl, cyclohexyl, methylcyclohexyl, ethylcyclohexyl, t-butylcyclohexyl, cyclooctyl, and decalyl. Illustrative aralkyls are benzyl, phenethyl, cumyl, xylylethyl, naphthenylisopropyl, and biphenylmethyl. Illustrative aryls are phenyl, xylyl, naphthenyl, methylnaphthenyl, biphenylyl, and t-butylphenyl.

Preferred acyl sulfonyl peroxides have the formula:

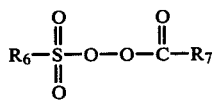

where (a) $R_6$ and $R_7$ are each selected from the class consisting of alkyl, cycloalkyl, aralkyl, aryl and haloradicals of each of the foregoing radicals with each radical having not more than 10 carbon atoms; and (b) $R_7$ may also be lower alkoxy.

The following examples will illustrate the improved efficiency of the present process. The data shown in the tables below was obtained in accordance with the following procedure.

Into a 12 fluid ounce pop bottle, containing 188.0 g of frozen suspension solution, were added the appropriate amount of peroxide and 75.0 g of vinyl chloride monomer. The peroxides of Tables 1–4 were added to the vinyl chloride monomer to comprise the weights shown in Tables 1–4. The pop bottle was capped, the contents almost melted, and then the bottle is placed in a rotating constant temperature bath for the times and temperatures shown in Tables 1–4. In Table 4, illustrating the results of copolymerization, the monomer mix was 88 percent by weight vinyl chloride and 12 percent by weight vinyl acetate. The improved reaction rates and polymer yield are as follows:

TABLE 1

Vinyl Polymerization at 55±1° C.

| Initiator | % wt | 1.5 Hrs. | 3.5 Hrs. | 5.5 Hrs. |
|---|---|---|---|---|
| t-Butyl Perneodecanoate (TBPD) | 0.02 | 7.9 | 22.7 | 39.0 |
|  | 0.03 | 12.1 | 34.1 | 56.2 |
|  | 0.04 | 15.0 | 41.6 | 68.3 |
|  | 0.05 | 19.0 | 49.5 | 80.7 |
| Acetyl cyclohexyl sulfonyl peroxide (ACSP) | 0.02 | 18.3 | 35.3 | 41.7 |
|  | 0.04 | 35.1 | 57.9 | 69.7 |
|  | 0.06 | 45.7 | 79.9 | 90.9 |
| TBPD/ACSP | 0.0375/0.0125 | 22.4 | 55.1 | 77.8 |
|  | 0.025/0.025 | 33.4 | 60.8 | 80.5 |

TABLE 2

Vinyl Polymerization at 60±1° C.

| Initiator | % wt | 1.5 Hrs. | 3.5 Hrs. | 5.5 Hrs. |
|---|---|---|---|---|
| t-Butyl Perneodecanoate (TBPD) | 0.02 | 11.3 | 32.6 | 49.4 |
|  | 0.04 | 23.6 | 61.0 | 81.0 |
| Acetyl cyclohexyl sulfonyl peroxide (ACSP) | 0.02 | 22.2 | 31.5 | 33.6 |
|  | 0.04 | 38.4 | 55.5 | 61.6 |
|  | 0.06 | 53.0 | 80.7 | 88.4 |
| TBPD/ACSP | 0.03/0.01 | 25.9 | 58.0 | 76.1 |
|  | 0.02/0.02 | 33.0 | 60.0 | 73.8 |

TABLE 3

Vinyl Polymerization at 55±1° C.

| Initiator | % wt | 1.5 Hrs. | 3.5 Hrs. | 5.5 Hrs. |
|---|---|---|---|---|
| t-Butyl perpivalate (TBPP) | 0.055 | 10.0 | 32.4 | 60.2 |
| t-Butyl Perneodecanoate (TBPD) | 0.055 | 21.0 | 61.4 | 85.2 |
| Acetyl cyclohexyl sulfonyl peroxide (ACSP) | 0.055 | 45.4 | 74.7 | 89.1 |
| TBPD/ACSP | 0.0367/0.0183 | 31.3 | 63.9 | 82.4 |
| TBPP/ACSP | 0.0367/0.0183 | 26.4 | 50.6 | 73.6 |
| TBPD/ACSP | 0.0275/0.0275 | 37.3 | 67.5 | 83.8 |
| TBPP/ACSP | 0.0275/0.0275 | 31.1 | 58.2 | 76.6 |
| TBPD/ACSP | 0.0183/0.0367 | 39.0 | 71.2 | 85.5 |
| TBPP/ACSP | 0.0183/0.0367 | 35.6 | 66.1 | 81.5 |

TABLE 4

Vinyl Copolymerization at 55±1° C.

| TBPD/ACSP | 0.0275/0.0275 | 34.9 | 65.6 | 81.4 |
|---|---|---|---|---|
| TBPP/ACSP | 0.0275/0.0275 | 30.9 | 57.9 | 76.6 |

TABLE 5

Vinyl Polymerization at 55±1° C.

| Initiator | %wt | 1.5 Hrs. | 3.5 Hrs. | 5.5 Hrs. |
|---|---|---|---|---|
| t-Butyl Perneodecanoate (TBPD) | 0.055 | 21.0 | 61.4 | 85.2 |
| t-Butyl PerpiValate (TBPP) | 0.055 | 10.0 | 32.4 | 60.2 |
| Acetyl Cyclohexane Sulfonyl Peroxide (ACSP) | 0.055 | 45.4 | 74.7 | 89.1 |
| Acetyl sec-Heptyl Sulfonyl Peroxide (ASHSP) | 0.055 | 46.5 | 73.5 | 84.5 |
| TBPP ACSP | 0.0275 0.0275 | 31.1 | 58.2 | 76.6 |
| TBPD ACSP | 0.0275 0.0275 | 37.3 | 67.5 | 83.8 |
| TBPD | 0.0275 | 33.6 | 64.9 | 83.6 |

TABLE 5-continued

| | Vinyl Polymerization at 55±1° C. | | | |
|---|---|---|---|---|
| | | % Conversion | | |
| Initiator | %wt | 1.5 Hrs. | 3.5 Hrs. | 5.5 Hrs. |
| ASHSP | 0.0275 | | | |
| TBPP | 0.0275 | 29.0 | 56.0 | 74.3 |
| ASHSP | 0.0275 | | | |

From the foregoing, particularly in the direct comparison of Tables 3, 4, and 5, it can be seen that from the beginning of the polymerization reaction to the substantially complete conversion in only 5.5 hours, use of the present combination of initiators is substantially more rapid than the combinations of initiators suggested and preferred in the prior art. Attention is also invited to Table 5 as illustrating the interchangeability of acyl sulfonyl peroxides in the present process in combination with the noted peresters used herein.

What is claimed is:

1. In a process for polymerizing vinyl chloride, and for copolymerizing vinyl chloride and up to 30 percent by weight of comonomers in aqueous suspension by heating to a temperature of 30°–90° C. under a pressure of up to 15 atmospheres in the presence of peroxide initiator, the improvement wherein said initiator is a mixture of an acyl sulfonyl peroxide and a perester of the formula

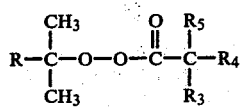

wherein $R_3$, $R_4$, and $R_5$ are the same or different alkyl groups of from 1 to about 10 carbon atoms provided not more than one of $R_3$, $R_4$, and $R_5$ is methyl, $R_3$, $R_4$, and $R_5$ together with the associated tertiary carbon atom and adjacent carbonyl group form a neodecanoate group and R is straight chain alkyl of 2–5 carbon atoms, in which the molar proportion between the acyl sulfonyl peroxide and perester is 3:1 to 1:5, and in which the acyl sulfonyl peroxide and perester are about 0.003–0.2 percent by weight of the monomers.

2. The improved process in accordance with claim 1 wherein said acyl sulfonyl peroxide has the formula

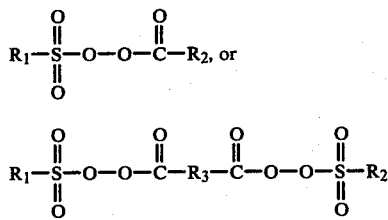

where, (i). $R_1$ and $R_2$ are each selected from the class consisting of alkyl, cycloalkyl, aralkyl and aryl, with each of the aforesaid radicals having not more than 20 carbon atoms; each of the aforesaid radicals may be substituted by lower acyloxy, lower alkoxy, lower alkoxycarbonyl, azido, carboxy, cyano, halo, or sulfo;

(ii). in addition to being any one of the radicals listed above, $R_2$ may be lower alkoxy;

(iii). $R_3$ is alkylene having 1–10 carbon atoms.

3. The improved process in accordance with claim 2 wherein said acyl sulfonyl peroxide has the formula

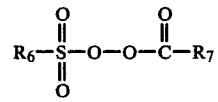

where (a) $R_6$ and $R_7$ are each selected from the class consisting of alkyl, cycloalkyl, aralkyl, aryl and the haloradicals of each of the foregoing radicals with each radical having not more than 10 carbon atoms; and (b) $R_7$ may also be lower alkoxy.

4. The improved process in accordance with claim 1, wherein the acyl sulfonyl peroxide and perester are about 0.01–0.1 percent by weight of the monomers.

5. The improved process in accordance with claim 1, wherein said monomer consists essentially of vinyl chloride.

6. The improved process in accordance with claim 1, wherein said monomers consists essentially of vinyl chloride and vinyl acetate.

7. The improved process in accordance with claim 1, wherein each of $R_3$, $R_4$, and $R_5$ has at least two carbon atoms.

8. The improved process in accordance with claim 1, wherein said perester is an isomeric mixture.

9. The improved process in accordance with claim 8, wherein said isomeric mixture comprises t-alkyl peroxyneodecanoates in which the acid moiety is derived from neodecanoic acids, about 31 percent by weight of which are α-dimethyl substituted, about 67 percent by weight of which are α-methyl-α-higher alkyl substituted, and about 2% by weight of which are α-dialkyl (higher than methyl) substituted.

10. The improved process in accordance with claim 9, wherein said monomer consists essentially of vinyl chloride.

11. The improved process in accordance with claim 9, wherein said monomer consists essentially of vinyl chloride and vinyl acetate.

12. The improved process in accordance with claim 10, wherein said acyl sulfonyl peroxide is acetyl cyclohexane sulfonyl peroxide.

13. The improved process in accordance with claim 10, wherein said acyl sulfonyl peroxide is acetyl sec-heptyl sulfonyl peroxide.

* * * * *